United States Patent
Komiyama et al.

(10) Patent No.: US 8,810,688 B2
(45) Date of Patent: Aug. 19, 2014

(54) INFORMATION PROCESSING APPARATUS AND INFORMATION PROCESSING METHOD

(75) Inventors: Akitsugu Komiyama, Tokyo (JP); Naoki Hayashi, Chiba (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 81 days.

(21) Appl. No.: 13/430,228

(22) Filed: Mar. 26, 2012

(65) Prior Publication Data

US 2012/0257083 A1 Oct. 11, 2012

(30) Foreign Application Priority Data

Apr. 8, 2011 (JP) ................................. 2011-086554

(51) Int. Cl.
*H04N 5/76* (2006.01)

(52) U.S. Cl.
USPC ................... 348/231.5; 348/231.2; 348/231.3; 348/231.6

(58) Field of Classification Search
CPC ....... H04N 5/77; H04N 1/2112; H04N 5/907; H04N 5/23293; H04N 5/232; H04N 2101/00; G06K 9/48
USPC ................... 348/231.2–231.6, 333.12; 386/3; 382/190
See application file for complete search history.

(56) References Cited

U.S. PATENT DOCUMENTS

| | | | |
|---|---|---|---|
| 5,796,428 A | 8/1998 | Matsumoto et al. | |
| 7,822,744 B2 | 10/2010 | Isomura | |
| 8,352,471 B2 | 1/2013 | Oami | |
| 2001/0015756 A1* | 8/2001 | Wilcock et al. | 348/158 |
| 2001/0022621 A1* | 9/2001 | Squibbs | 348/232 |
| 2003/0138148 A1* | 7/2003 | Itou | 382/224 |

(Continued)

FOREIGN PATENT DOCUMENTS

| | | |
|---|---|---|
| CN | 1744085 A | 3/2006 |
| CN | 1892658 A | 1/2007 |
| CN | 101253537 A | 8/2008 |
| CN | 101291409 A | 10/2008 |
| CN | 101373200 A | 2/2009 |
| CN | 101657815 A | 2/2010 |
| EP | 1630704 A2 | 3/2006 |
| EP | 2138939 A1 | 12/2009 |
| EP | 2405437 A1 | 1/2012 |
| WO | 03038680 A2 | 5/2003 |
| WO | 2006022289 A1 | 3/2006 |

(Continued)

OTHER PUBLICATIONS

European Search Report for corresponding EP Application No. 12160642, dated Dec. 4, 2012.
European Search Report for corresponding EP Application No. 12160642, dated Jul. 24, 2012.
Office Action for corresponding Chinese patent application No. 201210074900.0, dated Jan. 30, 2014.

*Primary Examiner* — Nhan T Tran
*Assistant Examiner* — Xi Wang
(74) *Attorney, Agent, or Firm* — Matthew B. Dernier, Esq.; Gibson & Dernier LLP

(57) ABSTRACT

A database stores a plurality of image data to which the shooting date is attached. A list displaying unit displays on a display device a list of thumbnail images of the image data. An instruction receiving unit acquires a thumbnail image as a specified image. An image classifying unit generates one or a plurality of groups of images by classifying the plurality of image data in terms of the year when the image data were shot. A representative image selector acquires, as a representative image of each image group, image data having a shooting month-day identical to or close to the shooting month-day of the image data corresponding to the specified image from each image group. The list displaying unit displays a list of the each image group for each year and displays the representative image placed at the head of each image group.

10 Claims, 7 Drawing Sheets

(56) References Cited

U.S. PATENT DOCUMENTS

| | | |
|---|---|---|
| 2003/0167264 A1* | 9/2003 | Ogura et al. .................. 707/3 |
| 2004/0264810 A1* | 12/2004 | Taugher et al. .............. 382/305 |
| 2005/0271352 A1* | 12/2005 | Yokouchi ...................... 386/4 |
| 2007/0011152 A1 | 1/2007 | Ikezawa |
| 2007/0147178 A1* | 6/2007 | Masuda et al. ................ 368/29 |
| 2008/0089592 A1 | 4/2008 | Isomura |
| 2008/0256577 A1 | 10/2008 | Funaki |
| 2008/0292212 A1 | 11/2008 | Ozaki |
| 2008/0297599 A1* | 12/2008 | Donovan et al. .............. 348/143 |
| 2009/0168089 A1* | 7/2009 | Hachiro ...................... 358/1.13 |
| 2010/0114891 A1 | 5/2010 | Oami |
| 2010/0321472 A1* | 12/2010 | Kuwabara et al. .............. 348/43 |
| 2011/0058087 A1* | 3/2011 | Ito et al. ................... 348/333.12 |
| 2012/0051644 A1* | 3/2012 | Das et al. ...................... 382/190 |

* cited by examiner

FIG.5

| IMAGE IDENTIFIER | ATTRIBUTE INFORMATION 22 | | | | | | | |
|---|---|---|---|---|---|---|---|---|
| | SHOOTING DATE | | PRIORITY INFORMATION | FABORITE | FEATURE VALUES | | | |
| | YEAR/MONTH/DAY | TIME (HOURS:MINUTES:SECONDS) | | | THE NUMBER OF PERSONS | SIMILAR SCENE | SHOOTING DENSITY | |
| ID000001 | 2007/3/3 | 14:20:10 | ○ | ○ | 4 | SCENE A | 30 PICTURES/HOUR | |
| ID000002 | 2007/3/3 | 14:21:30 | | | 3 | SCENE A | 30 PICTURES/HOUR | |
| ... | ... | ... | ... | ... | ... | ... | ... | |
| ID00000X | 2009/3/2 | 13:50:40 | ○ | | 4 | SCENE B | 28 PICTURES/HOUR | |
| ... | ... | ... | ... | ... | ... | ... | ... | |

INFORMATION PROCESSING APPARATUS AND INFORMATION PROCESSING METHOD

BACKGROUND OF THE INVENTION

1. Field of the Invention

The present invention relates to an information processing apparatus and an image processing method.

2. Description of the Related Art

In recent years, image pickup apparatuses, such as digital cameras and camera-equipped mobile phones, have been in widespread use, and thus users can obtain digital image data quite easily. While the camera function of a camera-equipped mobile phone is now capable of capturing digital image data of several million pixels, a compact-type digital camera can even capture digital image data in excess of ten million pixels. Also, high-end SLR (single-lens reflex) digital cameras, which were used mainly by professionals, are today reaching ordinary users. Moreover, cameras capable of shooting three-dimensional (3D) images, each including a first parallax image and a second parallax image of an object from different viewpoints, are now getting to a stage of popularization.

With the increased use of these image pickup apparatuses, there are more occasions where one needs to handle digital image data. For example, among the users writing their own blogs, there are even those who take several tens to hundreds of shots of digital image data per day. In this way, the number of shots to capture digital image data is increasing at an explosive rate. On the other hand, high-capacity recording devices capable of recording large volumes of these digital image data are also finding widespread use.

When a large volume of image data is stored in a recording device, there may be cases where it takes too long time for the user to find a desired image or images. Also, there may be cases where the user forgets the details of images he/she has recorded in the recording device. Thus, the larger the number of image data that are stored in a recording device, the harder it will be to manage the image data.

SUMMARY OF THE INVENTION

The present invention has been made in view of these problems, and a purpose thereof is to provide a technology for managing a large volume of digital image data easily and conveniently.

In order to resolve the aforementioned problems, one embodiment of the present invention relates to an information processing apparatus. This apparatus includes: a database configured to store, as attribute information, a plurality of image data to which a shooting timestamp, including the year, month, and day of the shooting, is attached; a list displaying unit configured to display on a display device a list of thumbnail images of a plurality of image data stored in the database; an instruction receiving unit configured to acquire a thumbnail image, which is among the thumbnail images displayed by the list displaying unit, as a specified image; an image classifying unit configured to generate one or a plurality of groups of images by classifying the plurality of respective image data in terms of the respective year of the shooting timestamp; a representative image selector configured to acquire, as a representative image of an image group, image data having a month and day that is identical to or approximately the month and day corresponding to the specified image acquired by the instruction receiving unit from each image group generated by the image classifying unit, wherein, when the representative image selector acquires the representative image of an image group, the list displaying unit displays a list of the one or more image groups sorted by year and displays the respective representative image placed at the head of each image group.

Another embodiment of the present invention relates to an image processing method. This method, executable by a processor, includes: displaying on a display device a list of thumbnail images of a plurality of image data in a database that stores a plurality of image data to which a shooting timestamp, including the year, month, and day of the shooting, is attached as attribute information; acquiring a thumbnail image, which is among the displayed thumbnail images, as a specified image; generating one or a plurality of groups of images by classifying the plurality of respective image data in terms of the respective year of the shooting timestamp, when the specified image is acquired; acquiring, as a representative image of an image group, image data having a month and day that is identical to or approximately the month and day corresponding to the specified image from each of the image groups generated; and displaying a list of each of the image groups sorted by year and displaying the respective representative image placed at the head of each image group, when the representative image of each image group is acquired.

Still another embodiment of the present invention relates to an information processing apparatus. This apparatus includes: a database configured to store a plurality of data including a three-dimensional image containing a plurality of images obtained when an object in a three-dimensional space is viewed from different viewpoints and a two-dimensional image corresponding to the three-dimensional image, and configured to store respective file names that are capable of uniquely identifying the plurality of image data and respective shooting timestamps, including the year, month, day, and time of shooting of the respective plurality of image data; an image classifying unit configured to identify the two-dimensional image corresponding to the three-dimensional image, based on the respective file name and timestamp; and a list displaying unit configured to display on a display device a list of thumbnail images that exclude the two-dimensional image identified by the image classifying unit.

Optional combinations of the aforementioned constituting elements, and implementations of the invention in the form of methods, apparatuses, systems, computer programs, data structures, recording media, and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIG. 5 is a schematic diagram showing an example of a data structure of attribute information to be stored in a database according to an embodiment;

DETAILED DESCRIPTION OF THE INVENTION

The invention will now be described by reference to the preferred embodiments. This does not intend to limit the scope of the present invention, but to exemplify the invention.

An information processing apparatus according to an embodiment enables classification of and selection from a plurality of image data based on the attribute information attached thereto so as to present a user with desired image data.

Figure 1:
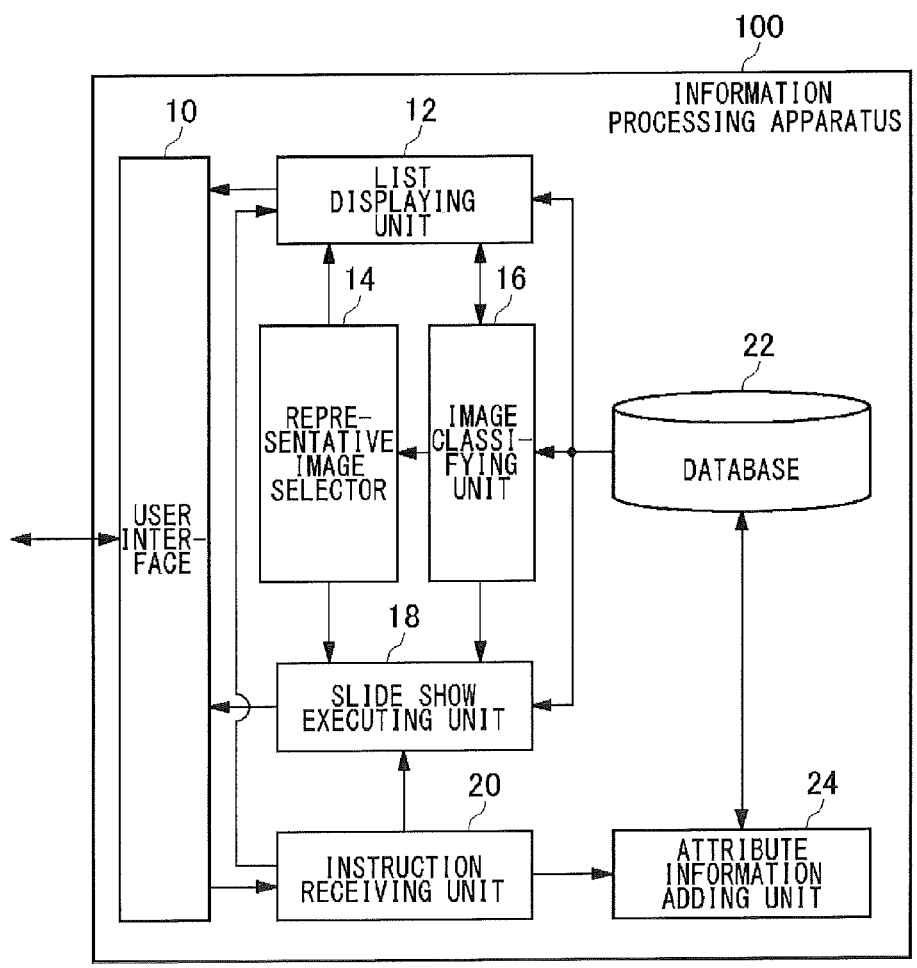
FIG. 1 is schematically shows an internal structure of an information processing apparatus according to an embodiment.

FIG. 1 is a schematic depiction showing an internal structure of an information processing apparatus 100 according to the present embodiment. The information processing apparatus 100 includes a user interface 10, a list displaying unit 12, a representative image selector 14, an image classifying unit 16, a slide show executing unit 18, an instruction receiving unit 20, a database 22, and an attribute information adding unit 24. FIG. 1 shows a functional structure by which to realize the information processing apparatus 100 of this embodiment by omitting the other structural features. In FIG. 1, the structural components described as functional blocks that perform various processings may be implemented hardwarewise by elements such as a CPU (Central Processing Unit), main memory and other LSIs (Large-Scale Integration), and softwarewise by memory-loaded programs or the like. Therefore, it will be obvious to those skilled in the art that these functional blocks may be implemented by a variety of manners including hardware only, software only or a combination of both and should not be considered as limiting. As an example of the information processing apparatus 100, there may be a stationary game device.

The database 22 stores mainly the digital image data of shots taken by the user. The database 22 can be implemented by a storage device, such as HDD (hard disk drive) or SSD (solid state drive) or a removable recording medium, such as Blu-ray Disc (registered trademark). The database 22 also stores attribute information added to image data. The attribute information will be later discussed in detail. It is to be noted that the image data stored in the database 22 include not only the ordinary two-dimensional (2D) images but also three-dimensional (3D) images, each composed of a pair of left-eye parallax image and right-eye parallax image, and multi-angle images.

The user interface 10 obtains user instructions to the information processing apparatus 100 via an input device (not shown) such as a controller. The user interface 10 also outputs images outputted by the information processing apparatus 100 to a display device (not shown) such as a monitor.

The list displaying unit 12 produces a list display of thumb nail images of a plurality of image data stored in the database 22 on the display device. In a case where there are too many image data stored in the database 22 and therefore not all the thumb nail images can be displayed on the display device, the user can make changes to the thumb nail images to be displayed on the display device by controlling the controller.

Figure 2:
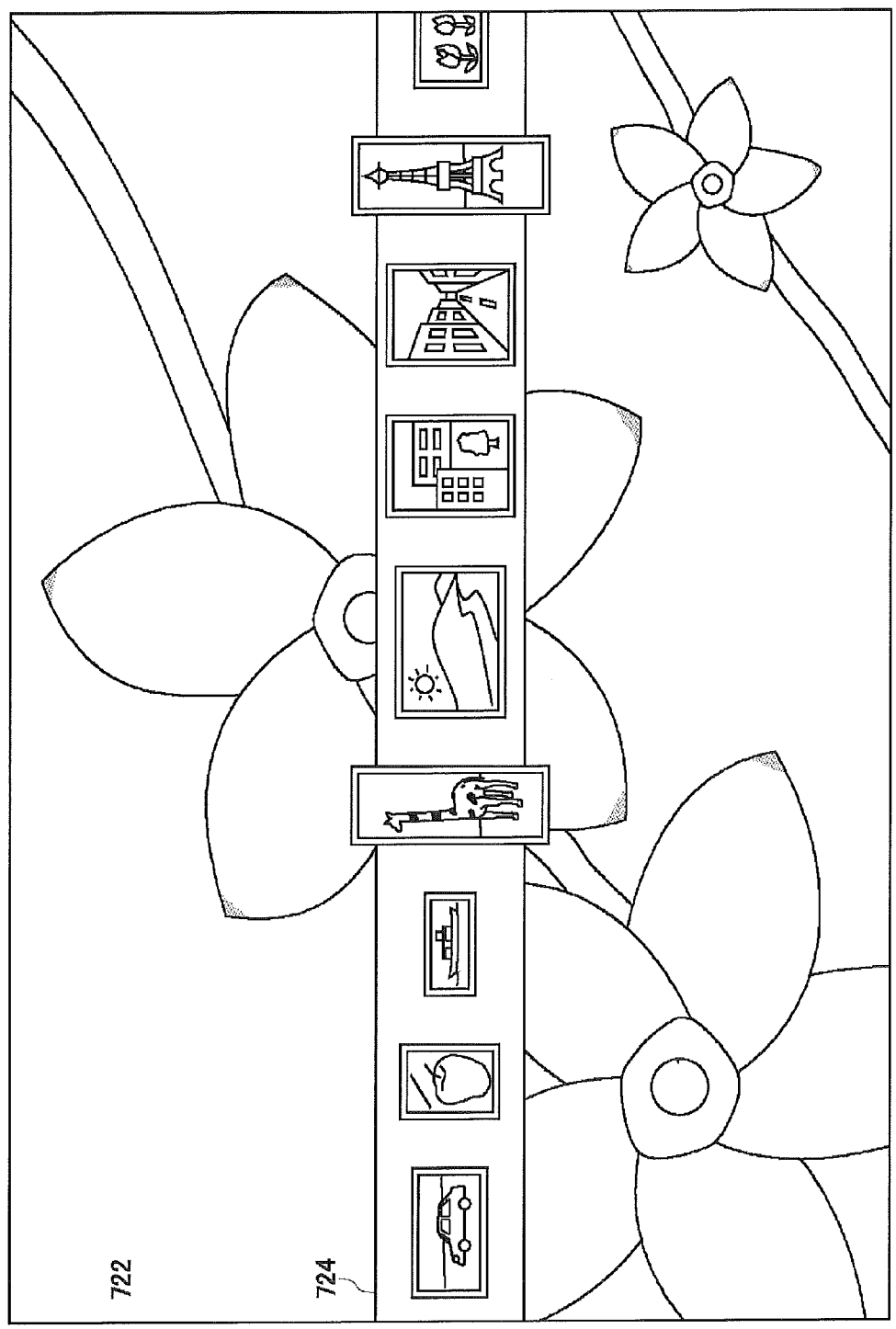
FIG. 2 schematically illustrates an example of a list display according to an embodiment.

FIG. 2 is a schematic illustration showing an example of a list display according to the present embodiment. As shown in FIG. 2, a band region 724 is generated distinctly on a background image 722 for the list display, and the thumbnail images of the image data stored in the database 22 are displayed on the band region 724. The thumbnail images displayed on the band region 724 can be changed freely by the user by pressing the buttons of a not-shown mouse or controller.

Here, the list displaying unit 12 may acquire the number of pixels of each image data to be displayed and may display, on the band region 724, larger thumbnail images for the image data with larger numbers of pixels than those for the image data with smaller numbers of pixels. Such an arrangement as this may be advantageous in that the user can grasp the sizes of image data at a glance.

Referring back to FIG. 1, the instruction receiving unit 20 acquires a thumb nail image specified by the user, which is among the thumbnail images displayed by the list displaying unit 12, as a specified image via the user interface 10. The specified image is, for instance, a thumbnail image of image data in which the user shows interest out of a plurality of image data.

Upon receipt of a specified image from the instruction receiving unit 20, the image classifying unit 16 generates groups of images by classifying a plurality of image data stored in the database 22 in terms of the year when the image data were shot. Accordingly, the image data belonging to each of the image groups generated by the image classifying unit 16 are those which have been taken in the same year.

The representative image selector 14 acquires image data having the same shooting date (month-day) as that of the image data corresponding to the specified image received by the instruction receiving unit 20 out of each of the image groups generated by the image classifying unit 16 as the respective representative images of the image groups. If there is no image data having the same shooting date as that of the image data corresponding to the specified image in an image group, then the representative image selector 14 will acquire image data having a shooting date (month-day) close to that of the image data corresponding to the specified image as the representative image of the image group. Therefore, the representative images are the image data having a shooting date (month-day) identical to or close to that of the image data corresponding to a specified image specified by the user although they have different shooting years from each other. Note here that the image data having a shooting date (month-day) close to that of the image data corresponding to the specified image is the image data whose shooting date is the closest to the specified shooting date among the image data in the group.

The events when the users may take more photos than usual, such as birthday, Christmas, Hina-matsuri (the Doll's Festival), Children's Day, fireworks display, or cherry blossom viewing, come around once a year. Therefore, it is quite probable that the image data having a shooting date identical to or close to that of the image data corresponding to a specified image is about the same annual event in each of the image groups classified by the year of shooting. Accordingly, the representative image selector 14 selects image data having a shooting date identical to or close to that of the image data corresponding to the specified image as representative images. Hereinbelow, the term "representative image(s)" should be understood to include the specified image unless otherwise indicated.

After the respective representative images of the image groups are generated by the representative image selector 14, the list displaying unit 12 produces a list display of the thumb nail images of the image data of the image groups on the display device. The list displaying unit 12 further displays a specified image or a representative image placed at the head of each image group. As previously noted, there is a high possibility that the specified image and representative images placed at the head of the respective image groups are thumbnail images of image data capturing the same annual event.

This will increase the chances of the user viewing the image data of the other years capturing the same event as one he/she has shown interest in. This is advantageous in that the user can easily obtain the image data he/she is interested in from among a plurality of image data stored in the database 22.

Upon receipt of a user instruction via the instruction receiving unit 20 that a slide show of image data is to be executed for the specified image group, the slide show executing unit 18 causes a slide show display of image data belonging to a group of images classified by the image classifying unit 16 on the display device. The slide show executing unit 18 also causes a slide show display in such a manner that the slide show is started with the specified image or the representative image selected by the representative image selector 14 leading the slide show and that the image data belonging to the image group including the representative image are shown in order of shooting time.

As discussed earlier, the representative image selector 14 selects a representative image based on the shooting date added to the image data. Note here that the information used by the representative image selector 14 in selecting a representative image, which is associated with the image data, is called "attribute information". In this sense, the shooting date (month-day) of image data is one member of attribute information.

Where there are a plurality of image data having the shooting date identical to or close to that of the image data corresponding to the specified image received by the instruction receiving unit 20, the representative image selector 14 narrows down the image data and acquires a representative image based on the attribute information. For this purpose, attribute information includes feature values that the representative image selector 14 references in selecting a representative image in preference to the others. The feature values of image data will be discussed in detail later.

Figure 3:
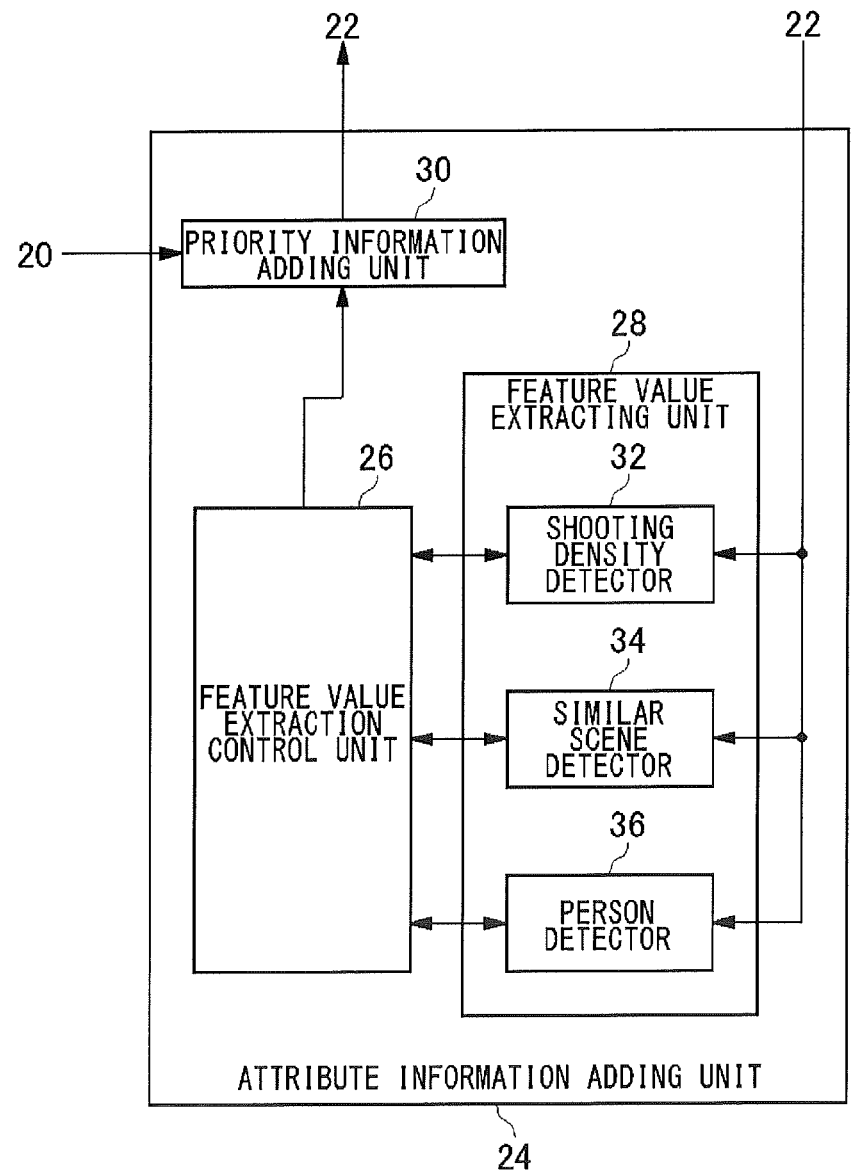
FIG. 3 schematically shows an internal structure of an attribute information adding unit according to an embodiment.

The attribute information adding unit 24 adds attribute information to each of the image data stored in the database 22. FIG. 3 is a schematic depiction showing an internal structure of the attribute information adding unit 24 according to an embodiment. The attribute information adding unit 24 includes a feature value extraction control unit 26, a feature value extracting unit 28, and a priority information adding unit 30.

The priority information adding unit 30 receives a designation of image data to which priority information is to be added, from the user via the instruction receiving unit 20, and stores the image data matched with the priority information in the database 22. The priority information adding unit 30 also stores in the database 22 the priority information that is obtained based on the feature values of image data acquired by the feature value extracting unit 28 via the feature value extraction control unit 26. The term "priority information" refers to the information indicating the image data to be selected preferentially as the representative image when the representative image selector 14 selects a representative image. The priority information is also a member of attribute information.

The term "feature values of image data" refers to, for instance, the shooting date (year-month-day) and shooting time added to the image data and also information that can be obtained through analysis of the image data itself. The information that can be obtained through analysis of the image data itself is, for example, the number of persons captured in the image data, the distribution of hue or brightness, and the like. The feature value extracting unit 28 further includes a shooting density detector 32, a similar scene detector 34, and a person detector 36 that acquire their respective feature values of image data.

The shooting density detector 32 generates image groups by classifying the image data obtained from the database 22 into groups in terms of the date when the image data have been shot. The shooting density detector 32 calculates the number of shootings per unit of time (hour) for each of the image groups generated.

Figure 4:
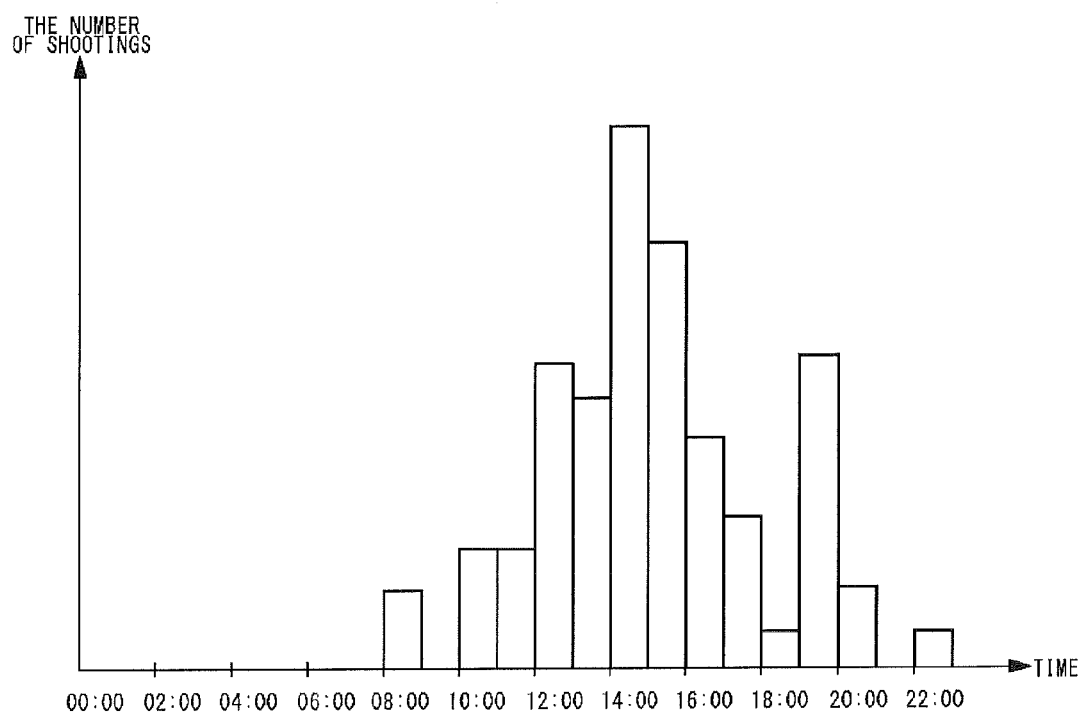
FIG. 4 is an example of a histogram indicating the numbers of shootings per unit of time (hour) on a specific shooting day.

FIG. 4 is an example of a histogram indicating the numbers of shootings per unit of time (hour) on a specific shooting day. In FIG. 4, the horizontal axis represents the shooting times (hours) of image data, and the vertical axis the numbers of shootings of image data during the respective shooting hours. By way of a concrete example, a description will be given of the changes in the number of shootings of image data on the day when a child's birthday party is held.

During the course of the morning of the day when a child's birthday party is held, the father of the child takes a number of test shots of some image data. Between 12:00 and 13:00, some commemorative photos of the family are taken when they get together for lunch. From 14:00 to 15:00, when the party is being held with the child and his/her friends attending, the father takes the largest number of shots per hour on this day. Therefore, in FIG. 4, the number of shootings during one hour between 14:00 and 15:00 is greater than any number of shootings during the other hours.

The shooting density detector 32 calculates the numbers of shootings per hour for a day as shooting densities and outputs them as feature values. The priority information adding unit 30 acquires the shooting densities calculated by the shooting density detector 32 via the feature value extraction control unit 26 and stores them in the database 22. The priority information adding unit 30 further adds priority information to the image data captured during the hour of the day whose shooting density per hour is the highest. The hour when the main event of the day is being held is considered to have the highest shooting density per hour. Therefore, it is possible to add priority information to the image data which is considered desirable as a representative image, thereby raising the probability of presenting the user with more meaningful images.

It is to be noted, however, that although the description so far has been of the case where the number of shootings is counted in units of one hour, the unit time is not limited to one hour, but may be determined as appropriate through experiment. Also, a plurality of unit times may be stored in the database 22, so that the user can change the unit time via the instruction receiving unit 20.

The similar scene detector 34 generates image groups classified by the date when they have been shot. The similar scene detector 34 further generates images having similar scenes as a group of similar scenes for each of the image groups generated. Detection of similar scenes from images can be accomplished, for instance, by comparing such statistics as hue distribution, chroma (intensity) distribution, brightness distribution, or the like of the images or calculating the sum of the absolute values of differences between the images and comparing the thus calculated sum thereof against a predetermined threshold value. The similar scene detector 34 adds a classification to each of the generated similar image groups.

The priority information adding unit 30 obtains similar scenes calculated by the similar scene detector 34 via the feature value extraction control unit 26 and stores the similar scenes in the database 22. The priority information adding unit 30 also adds priority information to the attribute information of the image data that is located in the middle of a similar image group when the images belonging to the image group are lined up in chronological order.

As mentioned above, the hour when a main event is being held tends to have a high shooting density, so that it is necessarily probable that more similar scenes are shot. Therefore, the priority information adding unit 30 may add priority information to the image data captured at the time corresponding to the temporally middle position of the hour of the main event. This will raise the probability of presenting the user with more meaningful image.

The person detector 36 generates image groups classified by the date when they have been shot. The person detector 36 determines whether an object scene contains a person or persons in the scene or not and counts the number of persons if there are any for each of the image groups generated. The person detector 36 may be implemented by the use of a human detection engine constructed by a known machine learning technique such as SVM (Support Vector Machine) or Boosting.

The priority information adding unit 30 obtains the number of persons detected by the person detector 36 via the feature value extraction control unit 26 and stores the detected number thereof in the database 22. Birthday parties or various events on Children's Day may have a person or persons playing a main role or roles. And the person or persons are important as the object of image-taking. The priority information adding unit 30 adds priority information to the image data capturing the largest number of persons who are considered important objects. This will raise the probability of presenting the user with more meaningful images.

The priority information adding unit 30 also obtains a "favorite image" from the user via the instruction receiving unit 20. The term "favorite image" here refers to an image that has been chosen specifically by the user and therefore is to be selected preferentially. Where the user himself/herself has selected a favorite image, the image can be made a representative image, thus reflecting the will of the user directly. Even where there is no favorite image selected by the user, selection of a representative image is made easier with a feature value added following the analysis of image data by the shooting density detector 32, the similar scene detector 34, or the person detector 36.

FIG. 5 is a schematic diagram showing an example of a data structure of attribute information to be stored in the database 22 according to an embodiment. As shown in FIG. 5, stored in the database 22 are image identifiers, which make image data uniquely identifiable, and attribute information of the image data associated with each other. The attribute information includes shooting date and feature value. The shooting date further includes the shooting date (year-month-day) and the shooting time. The feature value further includes the priority information, the favorite image or not, the number of persons in an object scene, the classification of similar scenes, and the shooting density. The image identifiers may be, for example, file names that can make image data uniquely identifiable.

The representative image selector 14 obtains attribute information from the database 22 via the image classifying unit 16 and selects a representative image. Where there are a plurality of candidates for the representative image to be obtained, the representative image selector 14 may obtain the image data of an earlier shooting time as the representative image. Also, when there are a plurality of candidates for the representative image to be obtained, a feature value to be used by the representative image selector 14 in selecting the representative image is determined beforehand. This can be accomplished, for instance, as follows. That is, the user sets a feature value to be used in selecting the representative image, in memory (not shown) within the attribute information adding unit 24 via the instruction receiving unit 20.

Figure 6:
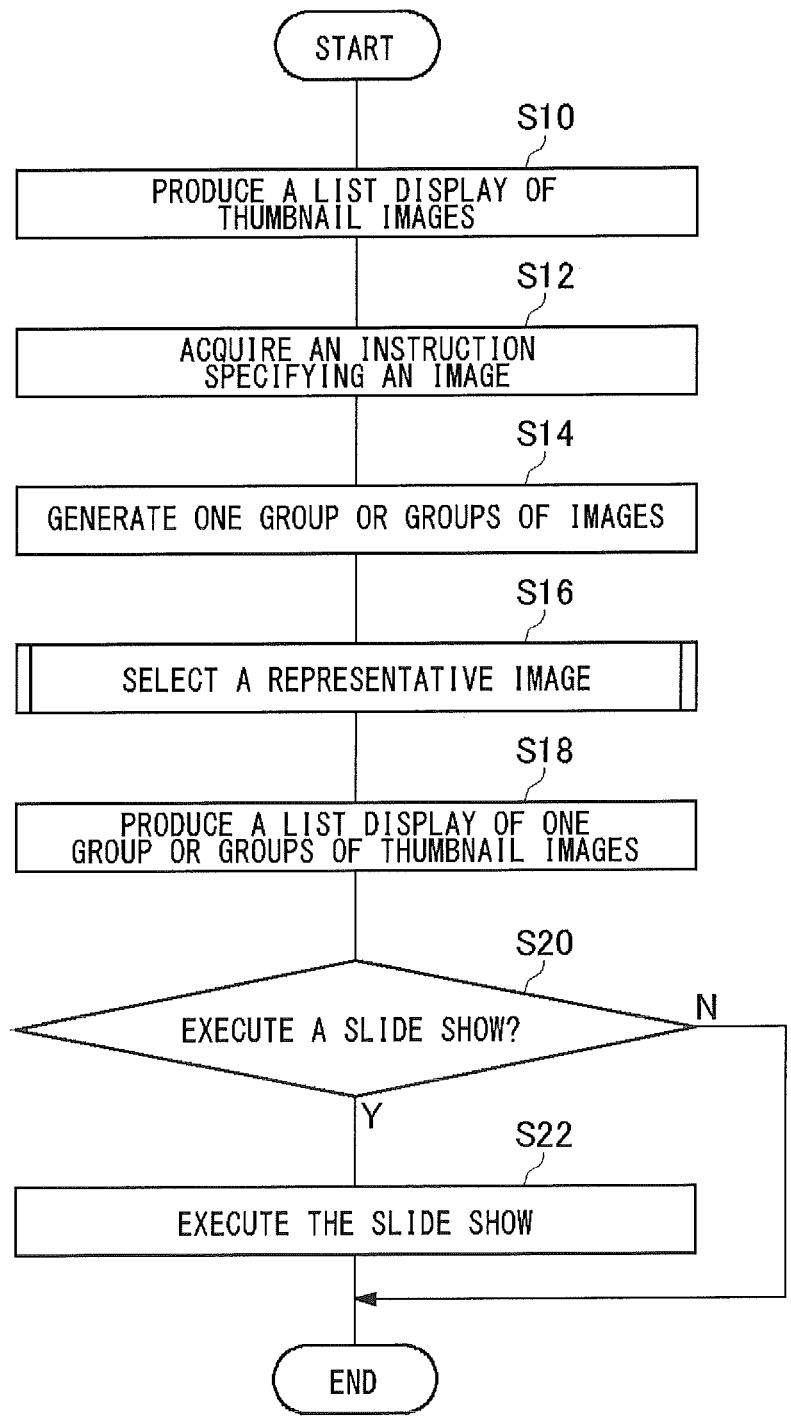
FIG. 6 is a flowchart explaining a flow of processing by an information processing apparatus according to an embodiment.

FIG. 6 is a flowchart explaining the flow of processing by an information processing apparatus 100 according to an embodiment. The processing shown in this flowchart starts with the power-on of the information processing apparatus 100, for instance.

The list displaying unit 12 produces a list display of thumbnail images of the image data stored in the database on the display device (S10). The instruction receiving unit 20 acquires, from the user, an instruction as to the specified image (S12). As the image classifying unit 16 acquires the specified image, the image classifying unit 16 generates one or a plurality of groups of images by classifying the image data in terms of the year when the image data corresponding to the specified image are shot (S14).

The representative image selector 14 selects and acquires a representative image from each of the respective groups of images generated by the image classifying unit 16 (S16). The list displaying unit 12 produces a list display of the groups of images, generated by the image classifying unit 16, for each year and displays the representative image, acquired by the representative image selector 14, placed at the head of each image group (S18). For example, the representative image selector 14 displays each image group in such a manner that the image groups generated by the image classifying unit 16 are stacked on one another, and also displays it in such a manner that the specified image and the representative image are placed on top of the image group corresponding thereto.

If the user instructs the execution of a slide show (Y of S20), the slide show executing unit 18 will execute the slide show by intermittently displaying the image group specified by the user in sequence on the display device (S22). Where the user does not instruct the execution of a slide show (N of S20), no particular process is performed by the slide show executing unit 18.

If the slide show executing unit 18 does not execute the slide show or if the user does not instruct the execution of the slide show, the processing in this flowchart will be terminated.

Figure 7:
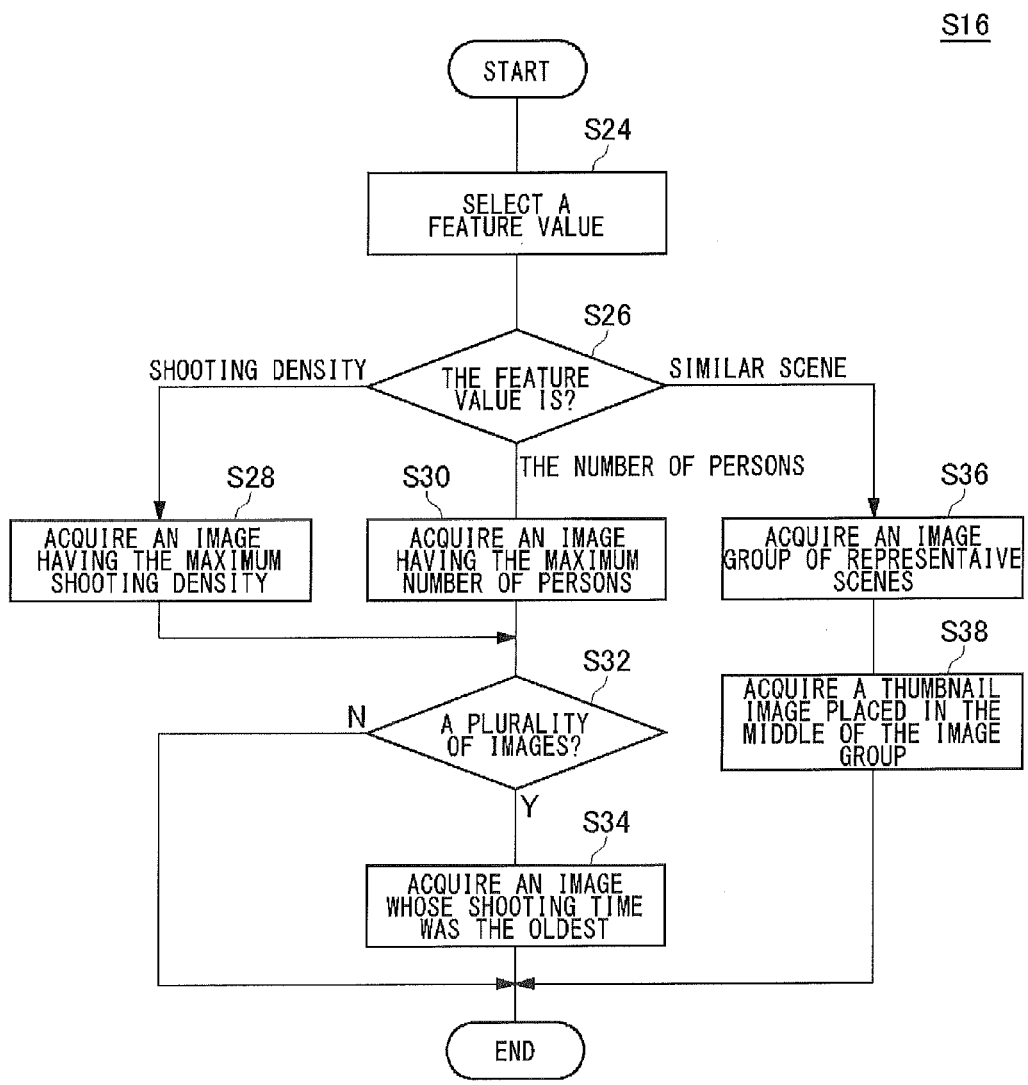
FIG. 7 is a flowchart explaining an operation of a representative image selector according to an embodiment.

FIG. 7 is a flowchart explaining an operation of the representative image selector 14 according to an embodiment when a favorite image is not specified, and FIG. 7 explains Step S16 of FIG. 6 in detail.

The feature value extraction control unit 26 selects a feature value which is to be used in selecting the representative image (S24). If the feature value selected is the shooting density (the shooting density in S26), the shooting density detector 32 will obtain the shooting density of each image and the representative image selector 14 will acquire the image data whose shooting density is the maximum among the shooting densities obtained (S28). If there are a plurality of image data having the maximum shooting density (Y of S32), the representative image selector 14 will acquire a thumbnail image of the image data whose shooting time was the earliest, as the representative image (S34). If there is only a single piece of image data having the maximum shooting density (N of S32), the representative image selector 14 will obtain the image as the representative image.

If the feature value selected is the number of persons (the number of persons in S26), the person detector 36 will count the number of persons contained in each image and the representative image selector 14 will acquire the image data having the maximum number of persons contained in the object scene (S30). If there are a plurality of image data having the maximum number of persons contained in the object scene (Y of S32), the representative image selector 14 will acquire a thumbnail image of the image data whose shooting time was the earliest, as the representative image (S34). If there is only a single piece of image data having the maximum number of persons contained therein (N of S32), the representative image selector 14 will obtain the image as the representative image.

If the feature value selected is the similar scene (the similar scene in S26), the similar scene detector 34 will generate groups of similar scenes and acquire a similar scene group having the largest amount of image data among the generated similar scene groups, as a representative scene image group (S36). When the image data belonging to the representative scene image group are arranged in chronological order, the representative image selector 14 acquires a thumbnail image of image data that is located in the middle of the image group, as the representative image (S38). As the representative image selector 14 has selected the representative image, the processing in this flowchart is terminated.

An operation implementing the above-described structure is as follows. As the user specifies a thumbnail image of the image data produced as a list display by the list displaying unit 12, the image classifying unit 16 generates groups of images by sorting out the image data stored in the database 22. The representative image selector 14 selects the image data which were shot in the other years but on the same month and day, and regards the thus selected data as the representative image(s) of each year. The list displaying unit 12 lays out the specified images and the representative images in some order so as to produce a list display of them.

By employing the information processing apparatus 100 according to the above-described embodiments, a technology that can manage a large volume of digital image data easily and conveniently can be provided. Since the representative image is selected based on the image specified by the user, the user may find images similar to those that the user shows interest in and thus directs his/her attention to or may also find unpredicted image data that the user has never imagined to come across.

The present invention has been described based upon illustrative embodiments. These exemplary embodiments are intended to be illustrative only and it will be obvious to those skilled in the art that various modifications to the combination of constituting elements and processes could be developed and that such modifications are also within the scope of the present invention.

A description has been given of a case where acquiring the image data, which the user may show interest, from the image data is supported in the light of the fact that if the amount of image data stored in the database 22 is large, it will be difficult to display a list of all image data on the display device and therefore the user will have to take the trouble of visually selecting an image.

Also, there are cases where a pair, a series of, or a set of pictures contain the same object scene in the image data. As a modification, a description is therefore given of a principle where the number of thumbnail images is reduced in such a manner that a pair of, a series of, or a set of image data in which an object or objects is/are almost identical are detected and the thumbnail images for the other half or the remaining image data are not displayed as a list.

Widely used in recent years is an image pickup device capable of capturing a multi-angle image obtained when an object in the three-dimensional space is captured successively from different angles and also capable of capturing a three-dimensional image including a first parallax image and a second parallax image when an object is viewed from different viewpoints. For example, in MPO (Multi-Picture object files) compliant with DCF (Design rule for Camera File system), there are cases where a 3D image and a 2D image, which pairs with the 3D image simultaneously when the 3D image is recorded in the MPO format, are recorded in the JPEG (Joint Photographic Experts Group) format. Similarly, there are cases where a multi-angle image and a 2D image pairing with the multi-angle image are recorded simultaneously.

When these image data are to be displayed by a general PC (Personal Computer), the images that pair with them are often handled as different image data. In such case, when those image data are displayed as a list, thumbnail images having similar scenes shot are displayed side by side. Thus it may be cumbersome for the user to search for an image. searching for image Hence, the image classifying unit 16 classifies the 2D images and 3D images that pair with each other, based on the file names and the image identifiers of the images. Similarly, the image classifying unit 16 classifies the 2D images and multi-angle images that pair with each other, based on the file names and the image identifiers of the images and the attribute information. More specifically, the image classifying unit 16 identifies image data that pair with a given image by checking to see if part of the file names matches and if the shooting time is close, for instance.

The list displaying unit 12 produces a list display of thumbnail images of the image data excluding the 2D images identified by the image classifying unit 16, on the display device. As a result, the probability that almost identical scenes may be displayed as a list can be reduced, and the troublesomeness situations in searching for image data can be reduced.

What is claimed is:
1. An information processing apparatus comprising:
a database configured to store, as attribute information, a plurality of image data to which a shooting timestamp, including the year, month, and day of the shooting, is attached;
a list displaying unit configured to display on a display device a list of thumbnail images of a plurality of image data stored in the database;
an instruction receiving unit configured to recognize a selection of a thumbnail image acquired as a specified image, among the thumbnail images displayed by the list displaying unit;
an image classifying unit configured to generate one or more image groups by classifying the plurality of respective image data in terms of the respective year of the shooting timestamp, each image group being represented by a representative image belonging to the respective year of the image group;
a representative image selector configured:
to choose the specified image as the representative image of the image group of the year of the specified image, and
to acquire, for image groups having a year that is different from the year of the specified image, image data from each image group generated by the image classifying unit as a representative image of each image group, respectively, the representative image having a month and day that is identical to or approximately the month and day corresponding to the specified image,
wherein, when the representative image selector acquires the representative image of each image group, the list displaying unit displays a list of the one or more thumbnail images of the image groups sorted by year and displays a thumbnail image of the respective representative image placed at the head of each thumbnail image of the image group, and wherein the attribute information further includes priority information indicating the image data to be selected preferentially by the representative image selector as the representative image.

2. An information processing apparatus according to claim 1, wherein, when there is a plurality of image data having (i) a year different from the year of the specified image and (ii) a month and day identical to or approximately the month and day of the image data corresponding to the specified image, the representative image selector acquires, as the representative image for the respective image group of the plurality of image data, a thumbnail image of image data including the priority information in the attribute information.

3. An information processing apparatus according to claim 2, further comprising:

a feature value extracting unit configured to generate one or more image groups of image data by classifying the image data in terms of a day when the image data are shot, and configured to extract a feature value by analyzing, for each of the generated image group, the image data or a shooting timestamp including a shooting time attached to the image; and a priority information adding unit configured to add the priority information based on the feature value extracted by the feature value extracting unit.

4. An information processing apparatus according to claim 3, wherein the feature value extracting unit includes a shooting density detector configured to acquire the number of pictures taken per hour for a day as the feature value, for each of the classified image group on the basis of the day when the respective image data are shot, and wherein the priority information adding unit adds the priority information to the attribute information of image data shot in a time zone during which the number of pictures taken is comparatively large per unit of time.

5. An information processing apparatus according to claim 3, wherein the feature value extracting unit includes a person detector configured to acquire the number of persons appearing in the image data included in an image group as the feature value, for each of the image groups that are classified by the day in which the respective image data are shot, and wherein the priority information adding unit adds the priority information to the attribute information of image data where the number of persons appearing in images is comparatively large.

6. An information processing apparatus according to claim 3, wherein the feature value extracting unit includes a similar scene detector configured to generate an image among a group of images having a similar scene, for each of the image groups classified on the basis of the day when the respective image data was shot, and wherein, when the images belonging to the similar image group are arranged in chronological order, the priority information adding unit adds the priority information to the attribute information of image data that is located in the middle of the image group with the similar scene.

7. An information processing apparatus according to claim 1, wherein the attribute information further includes shooting time, and wherein, when there are a plurality of candidates for the representative image to be acquired for a respective image group, the representative image selector acquires image data whose shooting time is comparatively early.

8. An information processing apparatus according to claim 1, further comprising a slide show executing unit configured to display on the display device a slide show of image data belonging to an image group classified by the image classifying unit, and wherein the slide show executing unit displays the slide show in such a manner that the slide show is started with the representative image selected by the representative image selector leading the slide show and that the image data belonging to the image group including the representative image are shown in order of shooting time.

9. An information processing method executable by a processor, the method comprising:

displaying on a display device a list of thumbnail images of a plurality of image data in a database that stores a plurality of image data to which a shooting timestamp, including the year, month, and day of the shooting, is attached as attribute information;

recognizing a selection of a thumbnail image acquired as a specified image, among the thumbnail images displayed;

generating one or more image groups by classifying the plurality of respective image data in terms of the respective year of the shooting timestamp, when the specified image is acquired, each image group being represented by a representative image belonging to the respective year of the image group;

choosing the specified image as the representative image of the image group of the year of the specified image;

acquiring, for image groups having a year that is different from the year of the specified image, image data from each image group generated by the image classifying unit as a representative image of each image group, respectively, the representative image having a month and day that is identical to or approximately the month and day corresponding to the specified image; and displaying a list of each of thumbnail image of the image groups sorted by year and displaying the respective representative image placed at the head of each thumbnail image of the image group, when the representative image of each image group is acquired, wherein the attribute information further includes priority information indicating the image data to be selected preferentially as the representative image.

10. A non-transitory computer-readable medium containing a program, the program comprising:

a first list displaying module operative to display on a display device a list of thumbnail images of a plurality of image data in a database that stores a plurality of image data to which a shooting timestamp, including the year, month, and day of the shooting, is attached as attribute information;

an instruction receiving module operative to recognize a selection of a thumbnail image and acquire the thumbnail image as a specified image, among the thumbnail images displayed;

an image classifying module operative to generate one or more image groups by classifying the plurality of respective image data in terms of the respective year when the respective image data are shot, when the specified image is acquired, each image group being represented by a representative image belonging to the respective year of the image group;

a representative image selecting module operative to choose the specified image as the representative image of the image group of the year of the specified image; and operative to acquire, for image groups having a year that is different from the year of the specified image, image data from each image group generated by the image classifying unit as a representative image of an image group, respectively, the representative image having a month and day that is identical to or approximately the month and day corresponding to the specified image; and a second list displaying module operative to display a list of each of thumbnail image of the image groups sorted by year and operative to display the respective representative image placed at the head of each thumbnail image of the image group, when the representative image of each image group is acquired, wherein the attribute information further includes priority information indicating the image data to be selected preferentially as the representative image.

* * * * *